April 14, 1925.

H. L. NELSON

CORN HUSKING MACHINE

Filed April 14, 1924    2 Sheets-Sheet 1

1,533,657

INVENTOR:
Henry L. Nelson
BY A.M. Carlsen
ATTORNEY.

April 14, 1925.

H. L. NELSON

CORN HUSKING MACHINE

Filed April 14, 1924　　2 Sheets-Sheet 2

1,533,657

INVENTOR:
Henry L. Nelson
BY A. M. Carlsen
ATTORNEY.

Patented Apr. 14, 1925.

1,533,657

UNITED STATES PATENT OFFICE.

HENRY L. NELSON, OF CANNON FALLS, MINNESOTA.

CORN-HUSKING MACHINE.

Application filed April 14, 1924. Serial No. 706,255.

*To all whom it may concern:*

Be it known that I, HENRY L. NELSON, a citizen of the United States, residing at Cannon Falls, in the county of Goodhue and State of Minnesota, have invented certain new and useful Improvements in Corn-Husking Machines, of which the following is a specification.

This invention relates to corn husking machines and may be considered as an attachment to such machines. The object is to further improve upon my invention covered by United States Patent Number 1,458,721, issued the 12th day of June 1923. Parts fully described in my said former patent or in similar machines in general I will in the present case refer to as little as possible, so as to simplify the specification.

Figure 1:
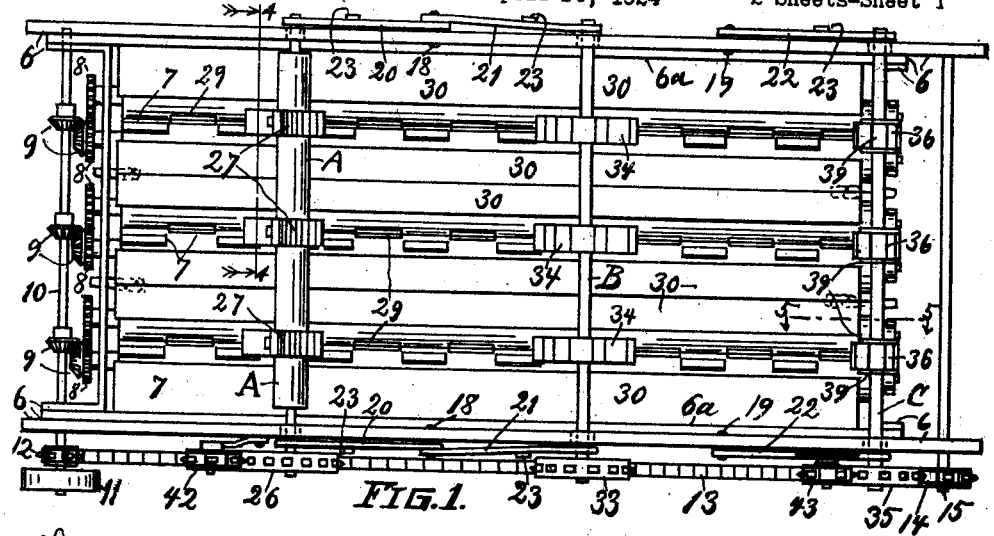
Fig. 1 is a top or plan view of a corn husker embodying my new improvements but with some of the common parts omitted.

Referring to the drawing by reference numerals, 6 designates the regular box-shaped frame in which inclined husking rollers 7 are journaled in pairs and rotated by cog wheels 8, bevel gears 9 and a transverse shaft 10 driven by a pulley 11 and having a sprocket 12 driving an endless link belt 13, which drives a sprocket 14 and shaft 15 of an endless elevator 16 (see to the right in Fig. 2) which serves to remove the husked corn guided down upon it by a guide 17 from the delivery end of the husker.

The longitudinal or side walls of the frame 6 are thickened by bars 6ª which may be inside, outside or in the walls.

To said embossed portions of the walls are pivoted at 18 and 19 pairs of swingable arms 20, 21 and 22, each of which has a pivoted rod 23 guided in a bracket 24 and normally pulled downward by a spring 25. Journaled in the arms 20 are the ends of a transversely arranged roller A having a sprocket 26 driven by the link belt 13 and having rigid, radiating, curved arms 27 with toothed working faces 28 moving above slots 29 between the usual guiding plates 30 which incline toward the slot and toward the delivery end of the machine and are agitated by one or more pitman 31 and a crank shaft 32 (partly shown in Fig. 3).

The next roller, B, has a sprocket 33 driven by link-belt 13 and carries fixed polygonal heads 34 one above each pair of the rollers 7.

The lowest roller, C, has a sprocket 35 driven by the chain 13 and is carrying fixed members 36, one above each pair of rollers 7 and having a pair of radiating curved and toothed arms 37 pivoted at 38 and held by springs 39 normally against lugs 40 on the head 36. The inner end of each of said springs is bent at right angles and inserted in holes 41 in the side of the head 36, or they may be secured in any other suitable manner so that the outer end will press the arms 37 normally into radial position.

The sprockets 42 and 43 are idlers holding the link-belt 13 properly engaged with the sprockets 26 and 35, but either of them may also be used as a belt stretcher.

Figure 2:
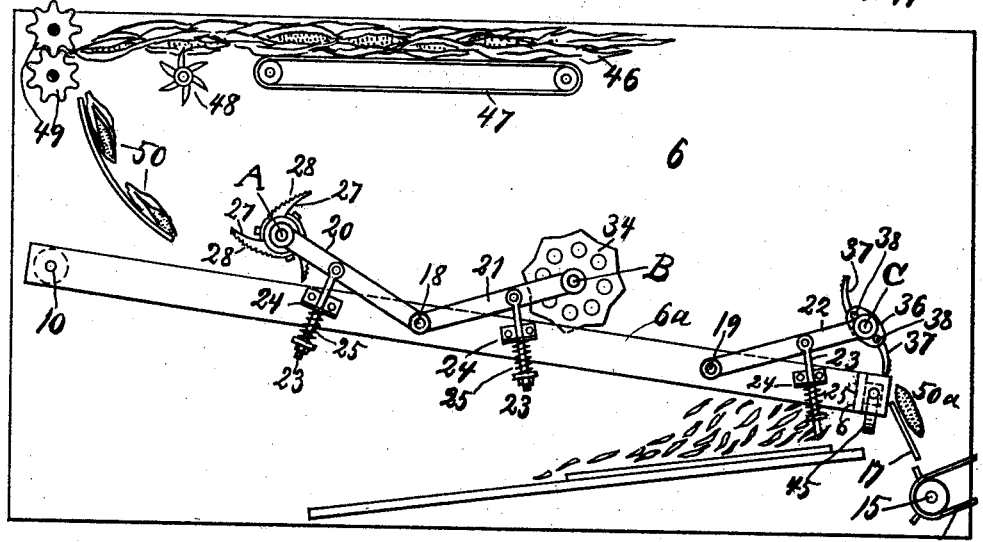
Fig. 2 is a side elevation of Fig. 1 with the near side wall and the sprocket wheels and belt chains omitted and a fragment of an elevator added.
Figure 3:
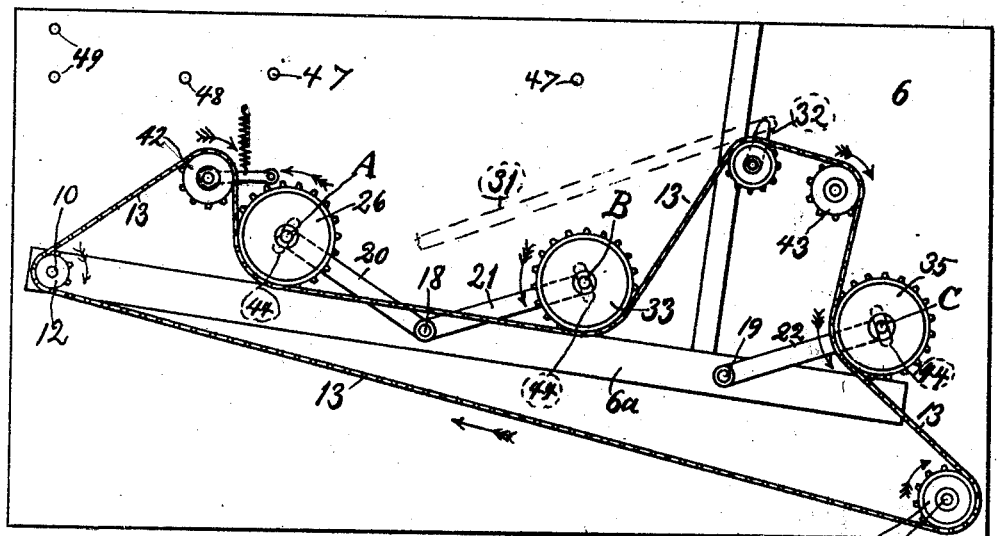
Fig. 3 is a side elevation of Fig. 1 with the drive pulley 11 and some other parts omitted and an agitator pitman partly shown.

In Fig. 3, 44 designate slots in the frame for the journals of the rollers to rise and fall in for large and small ears of corn passing under them. In Fig. 2, 45 is one of several U-shaped springs engaging the bearings of the husking rollers to prevent their spreading too far apart and to cause them to pull the husk down from the ears of corn, as more fully disclosed in my former patent.

Figures 4, 5:
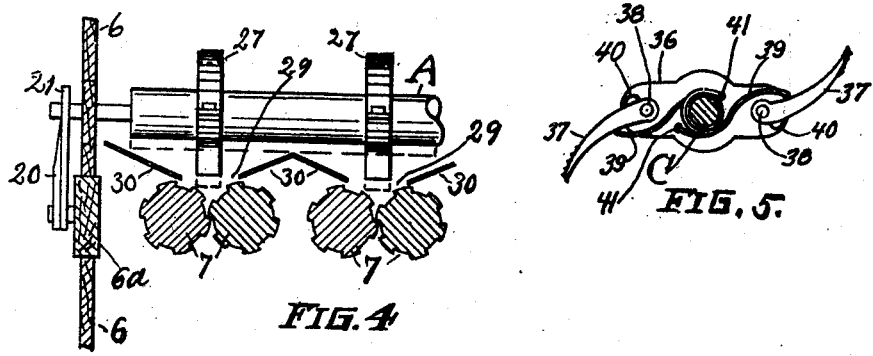
Fig. 4 is a section on the line 4—4 in Fig. 1 clarifying certain parts.
Fig. 5 is an enlarged section on the line 5—5 in Fig. 1.

In the operation of this machine, when corn stalks are fed, as 46 in Fig. 2, by an endless conveyor 47 and spreader 48 to snapping rollers 49, the ears of corn are snapped off and dropped as 50 down upon the upper ends of the husking rollers 7 and are then passed down the inclined husking roller by the agitation of the guides 30 and more forcibly moved by the roller arms 27, the polygonal heads 34 and the spring held arms 37 which eject the corn ears from the machine as at 50ª in Fig. 2. The springs 39 of said arms (see Fig. 5) will prevent breaking of the arms when the corn ears stick between the rollers, as they have a tendency to do at said point, but repeated actions of the arms dislodge them.

The roller A is thick enough to prevent corn ears passing under it except along the grooves formed by the guides 30 and thus all the ears get into contact with the husking rollers as they pass under roller A. The rollers B and C may therefore be of smaller diameter as they may never press directly upon the corn ears but press and move mainly by their rotating heads 34 and 36—37, while the heads 27 are the prime movers and pressers, and all of said pressing and moving devices are to some extent yieldable for small or large corn ears by the springs 25.

The device may easily be applied as an attachment to existing corn huskers and still more readily installed at the time the huskers are manufactured.

What I claim is:

1. In a corn husking machine the combination with inclined husking rollers arranged in pairs, of a series of rollers arranged across the upper sides of the husking rollers and means fixed on the crossing rollers for pressing downward on and moving the corn along the grooves formed by the upper sides of each pair of husking rollers; and springs arranged to impel the crossing rollers downward; said means fixed on the crossing rollers comprising on one roller a series of fixed, radiating, curved and rigid arms each with teeth upon its largest curved face.

2. In a corn husking machine the combination with inclined husking rollers arranged in pairs, of a series of rollers arranged across the upper sides of the husking rollers and means fixed on the crossing rollers for pressing downward on and moving the corn along the grooves formed by the upper sides of each pair of husking rollers; and springs arranged to impel the crossing rollers downward; said pressing means on one of the crossing rollers consisting of polygonal heads arranged one above each pair of the husking rollers.

3. The structure specified in claim 2, in which the means fixed on one of the crossing rollers consists of a series of members each with a plurality of radiating curved arms pivoted thereto, a spring acting on each arm to radiate it outward, and means for limiting such radiating movement.

4. The structure specified in claim 2, in which one of the crossing rollers has a series of radiating, spring-pressed arms with teeth arranged to engage the corn ears and eject them from the machine.

In testimony whereof I affix my signature.

HENRY L. NELSON.